United States Patent [19]

Gray

[11] Patent Number: 4,825,580

[45] Date of Patent: May 2, 1989

[54] FREE FLOATING FISHHOOK SETTING DEVICE

[76] Inventor: Vernon D. Gray, 90 W. Brewer, McAlester, Okla. 74501

[21] Appl. No.: 205,242

[22] Filed: Jun. 10, 1988

[51] Int. Cl.$^4$ ............................................... A01K 93/00
[52] U.S. Cl. ...................................... 43/44.9; 43/43.1; 43/44.91; 43/43.11; 43/44.95
[58] Field of Search .................... 43/44.9, 43.1, 43.11, 43/44.91, 44.95

[56] References Cited

U.S. PATENT DOCUMENTS

| | | | |
|---|---|---|---|
| 2,669,054 | 2/1954 | Smith | 43/43.11 |
| 2,694,878 | 11/1954 | Martens | 43/44.91 |
| 3,141,256 | 7/1964 | McBriar | 43/43.11 |
| 3,364,613 | 1/1968 | Sewell | 43/43.11 |
| 4,601,126 | 7/1986 | Klocksiem | 43/43.11 |
| 4,651,459 | 3/1987 | Wurtz | 43/15 |

Primary Examiner—Nicholas P. Godici
Assistant Examiner—Michael William Starkweather
Attorney, Agent, or Firm—Robert K. Rhea

[57] ABSTRACT

A fishing line is wound around a rotatable spool member and one end of the line is extended downwardly through an aperture in a buoyant body supporting the spool member. A winding mechanism connected to the spool member and an axle journalling the spool member normally biases the fishing line extended end portion toward a wound up position. Mounting members support the spool member and winding mechanism in a recess on the body for minimizing wind resistance. A brake mechanism depending from the buoyant body retards wind blown movement. A fish bite on the line pivots a trip member for releasing a wound up condition of the spool member in a fishing line winding up action on the spool for reeling in a fish caught on the line.

5 Claims, 1 Drawing Sheet

FREE FLOATING FISHHOOK SETTING DEVICE

BACKGROUND OF THE INVENTION

1. Field of the Invention

The present invention relates to lure or bait supported fish bite triggered hook setting devices.

It is common practice in fishing lakes or pools to attach a selected length of fishing line to a buoyant body, such as a closed gallon size empty plastic container, the opposite end of the hook being baited with a desired bait and the unit cast adrift on a body of water.

This invention is an improvement over this type of fishing apparatus by providing the float with a reel and trip means which is actuated by a fish taking the bait to set the hook in the fish's mouth and reel the fish to the position of the float.

2. Description of the Prior Art

Prior patents of this type generally disclose automatic fishhook setting devices used principally for fishing through holes cut in the ice.

U.S. Pat. No. 4,651,459 is an example of such fishing devices disclosing a horizontal platform having a bracket thereon in turn supporting a spring wound spool for retracting a fishing line. The platform is positioned over a hole in ice for ice fishing and the hook end of the fishing line extended through a hole in the platform and payed out to a selected depth. A trigger mechanism, released by a fish taking the bait, lets the spring wind the line on the drum to set the hook and reel in the fish.

This invention is distinctive over this patent principally by providing a buoyant body which offers minimum resistance to air currents and includes a brake member resisting wind blown movement of the device through water.

SUMMARY OF THE INVENTION

A buoyant body, having a vertical axial aperture, supports a reel mechanism on its upper surface having a fishing line wound thereon with one end of the line extending downwardly through the aperture a selected distance and provided with a fishhook at its depending end. Winding means normally urges the reel in a fish line winding up action. Reel mounting members connect the reel to the body and to the winding means. Radially disposed vanes, depending from the body, form a brake for resisting wind blown movement of the body across the surface of a lake, or the like.

The principal object of this invention is to provide a fishing float having a buoyant body minimizing wind resistance and including brake members impeding wind driven movement of the body and to provide a reel and trigger means tripped by a fish taking the bait for winding up the line and reeling in the fish.

DESCRIPTION OF THE PREFERRED EMBODIMENTS

Figure 1:
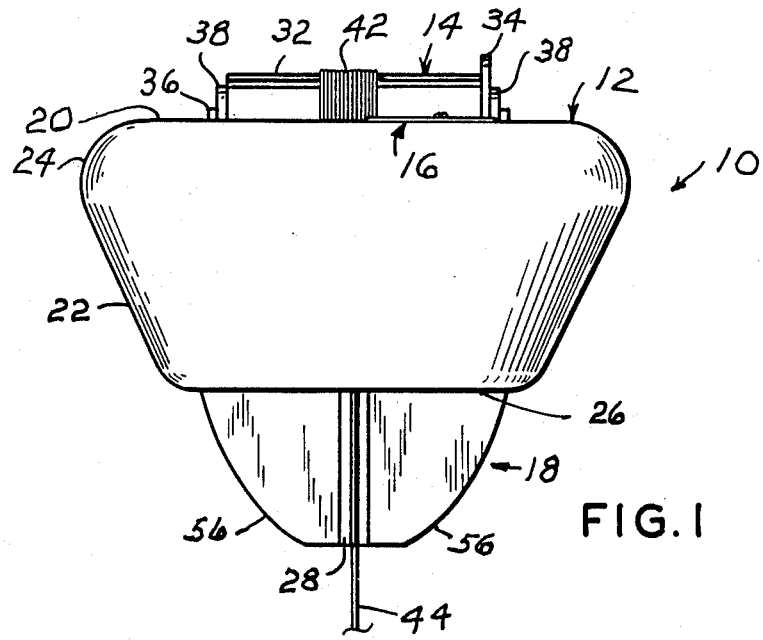
FIG. 1 is a side elevational view of the device; and,
FIG. 2 is a perspective view with parts broken away for clarity.
Figure 2:
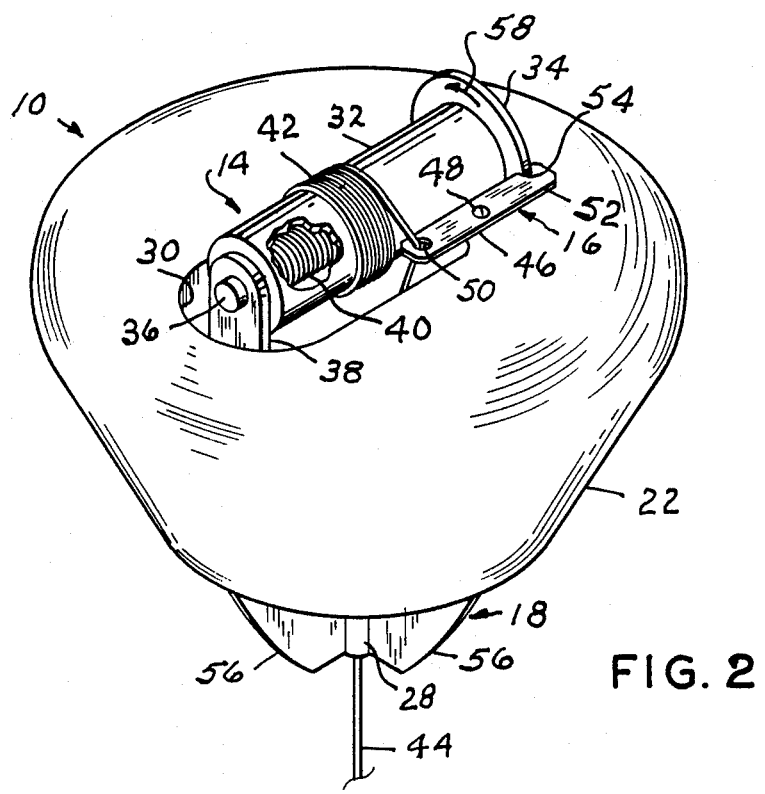

Like characters of reference designate like parts in those figures of the drawings in which they occur.

In the drawings:

The reference numeral 10 indicates the device, as a whole, comprising a body 12 of general inverted truncated cone-shape but obviously can be of any configuration desired. The device 10 further includes a spool or reel means 14, a trip means 16 for locking or releasing the reel means and brake means 18 forming a drag retarding wind movement through the water. The body 12 is provided with a normally upward substantially flat surface 20 joined to an annular downwardly converging wall 22 by an arcuate or curved body surface 24. The depending end 26 of the body is substantially parallel with its top end or surface 20. The body 12 is axially bored for vertically receiving an elongated tube 28 projecting a selected distance below the body surface 26. The top surface 20 of the body is provided with a transverse indentation or recess 30 at least partially nesting an elongated hollow spool 32 having an outstanding axial flange 34 at one end. An axle 36 projects axially through the spool and is journalled at its respective ends by mounting means comprising a pair of uprights 38 secured to the body within the recess 30. A helical spring 40 surrounds the axle within the spool with the respective ends, not shown, of the spring secured to the axle and spool respectively. A fishing line 42, secured at one end to the spool, is wound thereon and extended downwardly, at its other end portion 44, through the body bore and tube 28 contained thereby. The spring 40 normally biases the spool in a wind up action of the fishing line payed out end portion 44.

The trip means 16 comprises an elongated lever 46 pivotally connected with the body, as at 48, for horizontal pivoting movement about a vertical axis. One end portion of the lever is apertured, as at 50, for slidably receiving the fishing line one end portion 44. The other end portion 52 of the lever is cooperatively nested by a radial notch 54 formed in the periphery of the spool flange 44. Obviously, the periphery of the flange may be provided with a series of ratchet teeth, not shown. The lever 46, when engaged with the flange notch, thus forms a trigger for releasing the spool by a fish bite, as presently explained.

The brake means 18 comprises a plurality, four only three being shown, of vanes 56 preferably arranged in 90° spaced relationship and attached to the body surface 26 and to the sleeve 28 to extend radially outward therefrom.

Operation

The spring tension and the length of the line end portion 44 relationship is such that when the spring is in a position of repose a selected length of the line end portion 44 projects downward beyond the lower end limit of the sleeve 28 a selected distance to preclude the wind up action of the spring drawing a fish caught on the line into contact with the vane means 18 or depending end of the sleeve. Obviously, a stop, not shown, of larger diameter than the sleeve 28, may be attached to the line 44 at a selected position above the hook to prevent winding all of the line end portion 44 on the spool. The fishhook, not shown, is baited and the line end portion 44 manually pulled off the spool 40 in a paying out action to dispose the hook and bait at a selected depth in water. The lever end portion 52 is engaged with the flange notch 54 to set or lock the trip means and the device is launched into a body of water such as from a boat. When a fish takes the bait and pulls on the fishing line the line pulls the lever end portion 50 toward the axis of the spool thus releasing the lever end portion 52 from the notch and allowing the tension of the spring 40 to rotate the spool in the direction of the arrow 58 to wind up the fishing line end portion 44. Periodically the fisherman approaches the device 10 in a boat, or the like, and lifts it out of the water to retrieve the fish or replace the bait if it has been lost and a fish has not been caught.

Obviously the invention is susceptible to changes or alterations without defeating its practicability. Therefore, I do not wish to be confined to the preferred embodiment shown in the drawings and described herein.

I claim:

1. A float fishing apparatus, comprising:
   an upright buoyant body having an axial bore;
   a fishing line having one end portion extending through the bore;
   rotatable spool means having an axial flange at one end and having the other end portion of the flashing line wound on the spool means;
   mounting means supporting said spool means on the body;
   winding means connected with said mounting means and said spool means and biasing said spool means for winding said one end portion of the fishing line thereon; and,
   trip means normally preventing rotation of said spool means and releasable by a pull on said one end portion of the fishing line,
   said trip means including a lever pivotally supported intermediate its ends by said body and having an aperture in one of its end portions slidably receiving the fishing line said one end portion for pivoting the lever other end portion away from the periphery of said flange in response to the pull on the fishing line.

2. The float fishing apparatus according to claim 1 in which the spool flange is provided with a slot for cooperatively nesting an intermediate portion of the lever end portion opposite its aperture for cocking the spool means in a payed out condition of the said one end portion of the fishing line.

3. The float fishing apparatus according to claim 2 and further including:
   brake means depending from said body for dampening drift of the apparatus across a body of water in response to air currents against the exposed portion of the body when free floating and increasing the apparatus drag resistance of the apparatus when attempted to be moved across the surface of a body of water by a fish caught on said fishing line one end portion.

4. The float fishing apparatus according to claim 3 in which the brake means includes:
   a plurality of spaced-apart radially disposed vanes.

5. The float means according to claim 3 is which said body is provided with an upwardly open recess nesting said spool means and said mounting means for minimizing the surface area of the apparatus exposed to air currents.

* * * * *